No. 656,495. Patented Aug. 21, 1900.
J. P. ANDERSON.
CARBURETER.
(Application filed May 22, 1900.)
(No Model.)
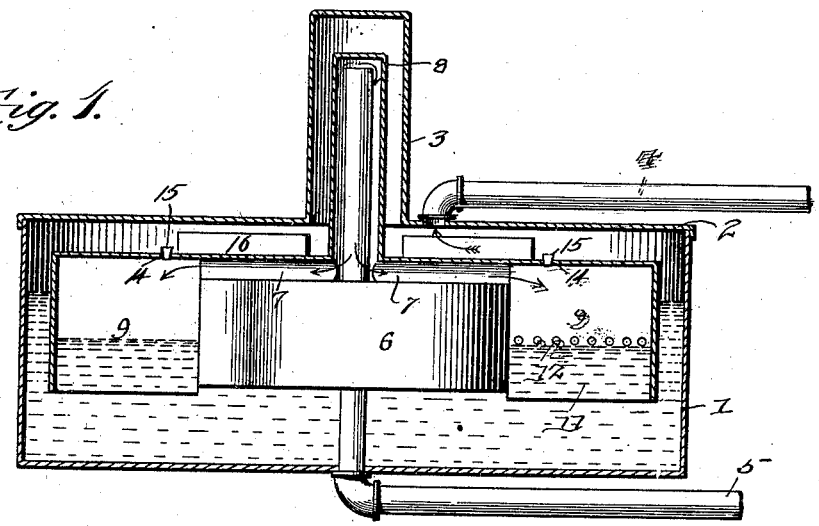
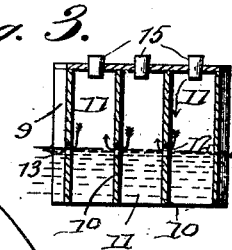
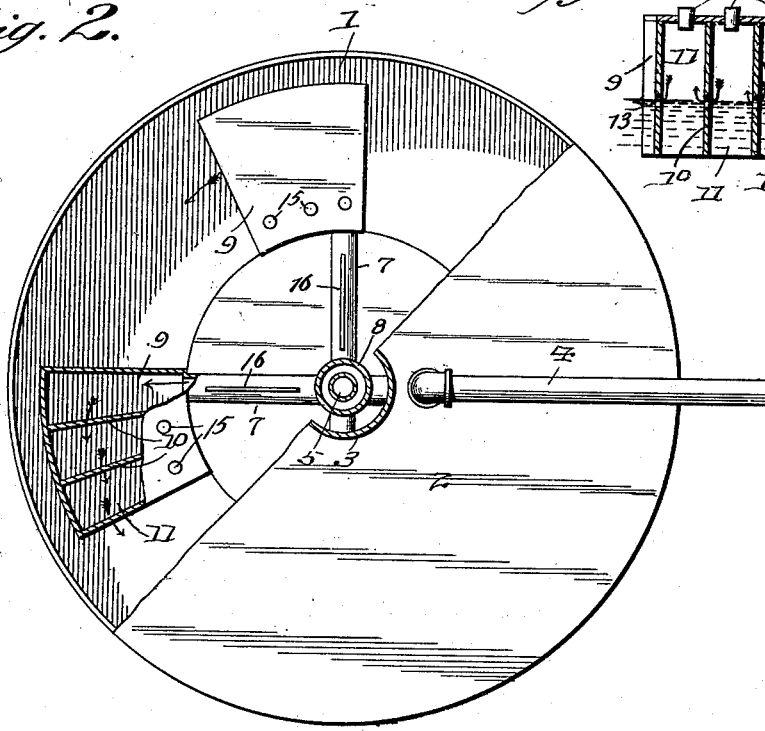
Witnesses
C. H. Walker
J. W. Garner
J. P. Anderson Inventor
by C. A. Snow & Co.
Attorneys

UNITED STATES PATENT OFFICE.

JAMES P. ANDERSON, OF ANAMOSA, IOWA.

CARBURETER.

SPECIFICATION forming part of Letters Patent No. 656,495, dated August 21, 1900.

Application filed May 22, 1900. Serial No. 17,585. (No model.)

*To all whom it may concern:*

Be it known that I, JAMES P. ANDERSON, a citizen of the United States, residing at Anamosa, in the county of Jones and State of Iowa, have invented a new and useful Carbureting Apparatus, of which the following is a specification.

My invention is an improved apparatus for carbureting air by forcing the same through a body of liquid hydrocarbon.

One object of my invention is to provide an improved apparatus whereby the gas obtained may be of any desired richness.

A further object of my invention is to provide means for thoroughly commingling the air and the vapor of liquid hydrocarbon.

My invention consists in the peculiar construction and arrangement of parts, which will be more fully hereinafter set forth, and pointed out in the claims.

In the accompanying drawings, Figure 1 is a vertical sectional view of a carbureting apparatus embodying my improvements. Fig. 2 is partly a top plan view and partly a sectional view of the same on the line *a a* of Fig. 1. Fig. 3 is a detail vertical transverse sectional view of one of the carbureting-chambers.

The hydrocarbon-tank 1 is circular in form, as shown, and the cover 2 thereof is provided with a central vertical extension 3, which is preferably cylindrical in form. The service-pipe 4 leads from the cover of the hydrocarbon-tank, and an air-pipe 5, through which air is forced by a suitable blower, (not shown,) extends vertically through the center of the hydrocarbon-tank and up into the vertical extension 3 of the cover thereof and is concentrically disposed therein, the upper end of the air-pipe being open. A circular float 6 is centrally disposed in the hydrocarbon-tank and is adapted to rotate freely on the vertical inner extension of the air-pipe 5, the latter passing centrally through the float, and the float is provided on its upper side with a series of radially-disposed air-pipes 7, which communicate at their inner ends with a vertically-disposed pipe 8, which surrounds the upper portion of the air-pipe 5 and is located concentrically therewith and with the vertical extension 3 of the tank-cover. A series of carbureting-chambers 9 are disposed on the outer sides of the float 6 and project radially therefrom. Said carbureting-chambers are closed on their upper sides and open on their lower sides, as shown, and each carbureting-chamber is provided with a series of radially vertically disposed baffle-plates 10, thereby dividing each of the carbureting-chambers into a series of sections 11, which communicate with each other through openings 12 in the baffle-plates. Similar openings 13 are in the sides of the carbureting-chambers opposite the direction of rotation of the float and the carbureting-chambers supported thereby. The innermost of the series of sections of each carbureting-chamber communicates with one of the pipes 7, as shown, and each of the other sections of each of the carbureting-chambers is provided on its upper side with an opening 14, commonly closed by a cork or other suitable closure, (indicated at 15.) Any desired number of baffle-plates may be employed in each of the carbureting-chambers and the latter divided into as many sections as may be required. Fan-blades 16, which are radially disposed, are located appropriately above the float 6 and adapted to be rotated thereby. As here shown, said fan-blades are secured on the upper sides of the radially-disposed air-pipes 7.

The operation of my invention is as follows: The tank 1 contains a body of liquid hydrocarbon, usually gasolene. The float being supported thereby supports the carbureting-chambers and maintains the latter at all times at the same depth within the body of the liquid hydrocarbon. The air which is forced through the pipe 5 escapes from the open inner upper end thereof into the pipe 8, down which it descends to the radial pipes 7, passes outward through said pipe 7 into the innermost of the sections of the carbureting-chambers, is forced downward through the body of hydrocarbon in the first section, escapes therefrom through the openings 12 into the next section in series, in which it ascends to the top of said section above the level of the liquid hydrocarbon, is then forced downward again through the hydrocarbon in the same section and through the opening 12 into the next section in series, the air in thus passing from section to section in each carbureting-chamber being effectually carbureted by being forced through the liquid hydrocarbon, as will be readily understood, and as the air issues from each carbureting-chamber through the openings 13 in the direction indicated by the feathered arrows the float carrying the carbureting-chambers is caused to rotate within the tank in the opposite direction, as will be readily understood. The carbureted air passes from the tank 1 through the service-pipe 4. The fan-blades 16 being set in motion by the rotation of the float and the carbureting-chambers serve to thoroughly admix the carbureted air and the vapors arising from the body of the hydrocarbon prior to the discharge of the carbureted air through the service-pipe. When all the openings 14 in the carbureting-chambers are closed by the corks or closures 15, the air, as the same is in process of becoming carbureted, is caused to pass through the entire series of sections of the carbureting-chambers; but by removing some of the corks or closures the air may be caused to escape from the carbureting-chambers after having passed through any desired number less than the entire series of the sections thereof, and hence gas or carbureted air of any desired richness may be obtained, as will be understood.

Having thus described my invention, I claim—

1. A carbureting apparatus comprising a tank, an air-inlet pipe having a vertical terminal arm extending upward from the bottom of the tank, a float revoluble on said arm of said pipe and having the pipe 8 on its upper side, around the said arm of said air-pipe, the latter discharging into said pipe 8, a series of radially-disposed carbureting-chambers on the said float, air-pipes 7 connecting pipe 8 with said carbureting-chambers, and a service-pipe leading from the said tank at a point above the said float, substantially as described.

2. In a carbureting apparatus, the combination with a closed tank for liquid hydrocarbon, of a float revoluble therein, carbureting-chambers carried by said float and immersed in the liquid hydrocarbon, means to force air through said carbureting-chambers into the liquid hydrocarbon, and a fan on the upper side of the revoluble float within the gas-space of the tank, substantially as described.

3. In a carbureting apparatus, a tank for liquid hydrocarbon, a float revoluble therein, and having carbureting-chambers divided into communicating sections, said sections having openings on their upper sides, and removable closures for said openings, means to force air through said carbureting-chambers, into the hydrocarbon in which they are immersed, and a service-pipe leading from the said tank, substantially as described.

In testimony that I claim the foregoing as my own I have hereto affixed my signature in the presence of two witnesses.

JAMES P. ANDERSON.

Witnesses:
E. O. SAYLE,
W. H. CAMPBELL.